United States Patent Office 2,744,119
Patented May 1, 1956

2,744,119

PHTHALYL-ALANYL-MERCAPTOETHYL AMIDES AND PREPARATION THEREOF

Edward Walton, Scotch Plains, N. J., assignor to Merck & Co., Inc., Rahway, N. J., a corporation of New Jersey No Drawing. Application January 6, 1953, Serial No. 329,929

12 Claims. (Cl. 260—326)

This invention relates to the preparation of pantetheine, $\alpha,\gamma$ - dihydroxy - $\beta,\beta$-dimethylbutyryl-$\beta$-alanyl-$\beta$-aminoethanethiol. It is also concerned with the preparation of the novel compounds produced as intermediates in the synthesis of $\alpha,\gamma$ - dihydroxy - $\beta,\beta$-dimethylbutyryl-$\beta$-alanyl-$\beta$-aminoethanethiol.

It has been found that $\alpha,\gamma$-dihydroxy-$\beta,\beta$-dimethylbutyryl - $\beta$ - alanyl-$\beta$-aminoethanethiol possesses marked and effective biological activity which stimulates the growth of *Lactobacillus bulgaricus* and is related to coenzyme A. It has also been found that $\alpha,\gamma$-dihydroxy-$\beta,\beta$ - dimethylbutyryl - $\beta$ - alanyl - $\beta$ - aminoethanethiol possesses pantothenic acid activity.

In accordance with this novel process for preparing $\alpha,\gamma$ - dihydroxy - $\beta,\beta$-dimethylbutyryl-$\beta$-alanyl-$\beta$-aminoethanethiol, one of the starting materials utilized is a compound which may be identified by the following formula

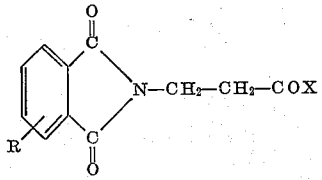

wherein R is hydrogen, alkyl, alkoxy, aryl, halo or nitro, and X is halide.

The other starting material utilized is S-substituted-$\beta$-aminoethanethiol and may be represented by the formula

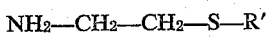

$$NH_2—CH_2—CH_2—S—R'$$

wherein R' is a radical removable by reduction.

The S - substituted - $\beta$ - aminoethanethiol compounds which may be employed include compounds wherein the S-substituent is a suitable alkenyl or aralkyl radical having a double bond in the $\beta,\gamma$-position relative to the sulfur atom.

Either N-phthalyl-$\beta$-alanyl halide or N-(substituted phthalyl)-$\beta$-alanyl halide described above can be caused to react with S-substituted-$\beta$-aminoethanethiol, wherein the substituted radical is removable by reduction, to yield a compound having the following formula

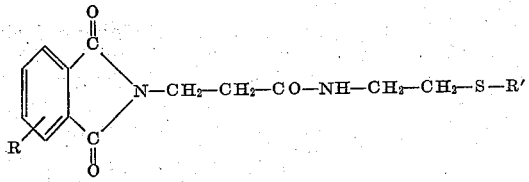

wherein R and R' are as above.

The above product is reacted with a hydrazine to form a compound of the formula

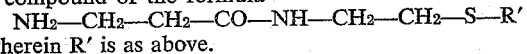

$$NH_2—CH_2—CH_2—CO—NH—CH_2—CH_2—S—R'$$

wherein R' is as above.

In carrying out this novel process, either N-phthalyl-$\beta$-alanyl halide or N-(substituted-phthalyl)-$\beta$-alanyl halide can be employed. Some of the N-(substituted-phthalyl)-$\beta$-alanyl halides which may be utilized are N-(3-alkyl-phthalyl)-$\beta$-alanyl halide, N-(3-alkoxyphthalyl)-$\beta$-alanyl halide, N - (3-arylphthalyl)-$\beta$-alanyl halide, N-(4-arylphthalyl)-$\beta$-alanyl halide, N - (3-halophthalyl)-$\beta$-alanyl halide, or N-(3-nitrophthalyl)-$\beta$-alanyl halide.

Some of the S-substituted-$\beta$-aminoethanethiols which can be employed wherein the substituted radical is an alkenyl or aralkyl radical having a double bond in the $\beta,\gamma$-position relative to the sulfur atom, are S-benzyl-$\beta$-aminoethanethiol, S - allyl - $\beta$-aminoethanethiol, S-methallyl-$\beta$-aminoethanethiol or S-crotyl-$\beta$-aminoethanethiol.

In accordance with this novel process, N-phthalyl-$\beta$-alanyl halide or N-(substituted-phthalyl)-$\beta$-alanyl halide wherein the substituted group is alkyl, alkoxy, aryl, halo or nitro, is reacted with an approximately equimolar quantity of S-substituted-$\beta$-aminoethanethiol wherein the substituted radical is removable by reduction in the presence of an acid binding agent and an inert solvent.

The acid binding agent may be any organic or inorganic base capable of reacting with the acid formed during the reaction. Alkali or alkaline earth metal hydroxides, oxides or carbonates, and organic bases, such as tetraalkylammonium hydroxides or tertiary amines, may be used for this purpose. Sufficient acid binding agent is employed to neutralize the acid formed during the reaction.

In carrying out the reaction, any solvent may be employed, provided the solvent does not react with the N-substituted-$\beta$-alanyl halide. Saturated hydrocarbons, aromatic hydrocarbons, halogenated hydrocarbons, such as octanes, benzene, chloroform, ethyl ether, dibutyl ether and dioxane are suitable solvents for this reaction. Dioxane is the preferred solvent for the reaction of N-phthalyl-$\beta$-alanyl halide with S-substituted-$\beta$-aminoethanethiol.

Although the reaction temperature is not critical, the reaction of N - substituted - $\beta$ - alanyl halide with S-substituted-$\beta$-aminoethanethiol is exothermic and it is preferable to maintain the reaction mixture at temperatures below 20° C. by cooling. The reaction proceeds rapidly at temperatures below 20° C. so that prolonged stirring is unnecessary.

It is not necessary to further purify the N-substituted-$\beta$ - alanyl - S - substituted-$\beta$-aminoethanethiol wherein the radical at the nitrogen is phthalyl or substituted phthalyl and the radical at the sulfur is removable by reduction to carry out the next step in the reaction. For example, if desired, purification of the N-phthalyl-$\beta$-alanyl-S-substituted-$\beta$-aminoethanethiol may be accomplished by recrystallization from ethyl acetate.

N - substituted - $\beta$-alanyl-S-substituted-$\beta$-aminoethanethiol wherein the radical at the nitrogen is phthalyl or substituted phthalyl and the radical at the sulfur is removable by reduction, is reacted with a hydrazine in an inert solvent and the phthalhydrazide separates as a solid. The solvent utilized in this reaction should be inert under the reaction conditions, should dissolve the reactants and should precipitate the formed phthalhydrazide. Ethanol at reflux temperature is the preferred solvent, although other lower or higher alcohols may be used, provided the temperature is held within the range of about 60-110° C. The precipitated phthalhydrazide may be removed by filtration and the solution containing $\beta$-alanyl-S-substituted-$\beta$-aminoethanethiol may be employed without further purification.

The reaction of $\beta$ - alanyl - S - substituted - $\beta$ - aminoethanethiol wherein the substituted group is removable by reduction and $\alpha$-hydroxy-$\beta,\beta$-dimethyl-$\gamma$-butyrolactone to form $\alpha,\gamma$ - dihydroxy - $\beta,\beta$-dimethylbutyryl-$\beta$-alanyl-S-benzyl-$\beta$-aminoethanethiol and reduction of the latter compound to form $\alpha,\gamma$-dihydroxy-$\beta,\beta$-dimethylbutyryl-$\beta$-alanyl-$\beta$-aminoethanethiol is fully disclosed and claimed in my co-pending application filed on even date herewith Serial No. 329,928, now abandoned.

The following examples illustrate methods of carrying

EXAMPLE 1

*Preparation of N-phthalyl-β-alanyl-S-benzyl-β-aminoethanethiol*

A solution of 22 g. (0.093 mole) of N-phthalyl-β-alanyl chloride in 60 ml. of dry dioxane was added dropwise to a suspension of 16.3 g. (0.097 mole) of S-benzyl-β-aminoethanethiol in 260 ml. of ice water and 40 ml. of 2.5N sodium hydroxide solution. The addition required 15 minutes and the reaction was stirred an additional two hours. The precipitated, solid, crude product, N-phthalyl-β-alanyl-S-benzyl-β-aminoethanethiol, was removed and dried at 60° C. under reduced pressure. The product was recrystallized from 180 ml. of ethyl acetate to yield N-phthalyl-β-alanyl-S-benzyl-β-aminoethanethiol. The solid was then dissolved in 300 ml. of chloroform and the solution washed with a saturated sodium bicarbonate solution, water, 1N hydrochloric acid, and finally three times with water. The chloroform solution was concentrated to dryness, and the residue recrystallized from 100 ml. of ethyl acetate.

In like manner, N-(3-methylphthalyl)-β-alanyl halide, N-(3-methoxyphthalyl)-β-alanyl halide, N-(3-phenylthalyl)-β-alanyl halide, N-(4-phenylphthalyl)-β-alanyl halide, N-(3-bromophthalyl)-β-alanyl halide, N-(3-chlorophthalyl)-β-alanyl halide or N-(3-nitrophthalyl)-β-alanyl halide may be substituted for N-phthalyl-β-alanyl halide in the above procedure. Also, S-allyl-β-aminoethanethiol, S-methallyl-β-aminoethanethiol or S-crotyl-β-aminoethanethiol can be substituted for S-benzyl-β-aminoethanethiol in the above procedure. Reactions employing these starting materials result in the following compounds: N-phthalyl-β-alanyl-S-allyl-β-aminoethanethiol, N-phthalyl-β-alanyl-S-methallyl-β-aminoethanethiol, N-phthalyl-β-alanyl-S-crotyl-β-aminoethanethiol, N-(3-methylphthalyl)-β-alanyl-S-benzyl-β-aminoethanethiol, N-(3-methylphthalyl)-β-alanyl-S-allyl-β-aminoethanethiol, N-(3-methylphthalyl)-β-alanyl-S-methallyl-β-aminoethanethiol, N-(3-methylphthalyl)-β-alanyl-S-crotyl-β-aminoethanethiol, N-(3-methoxyphthalyl)-β-alanyl-S-benzyl-β-aminoethanethiol, N-(3-methoxyphthalyl)-β-alanyl-S-allyl-β-aminoethanethiol, N-(3-methoxyphthalyl)-β-alanyl-S-methallyl-β-aminoethanethiol, N-(3-methoxyphthalyl)-β-alanyl-S-crotyl-β-aminoethanethiol, N-(3-phenylphthalyl)-β-alanyl-S-benzyl-β-aminoethanethiol, N-(3-phenylphthalyl)-β-alanyl-S-allyl-β-aminoethanethiol, N-(3-phenylphthalyl)-β-alanyl-S-methallyl-β-aminoethanethiol, N-(3-phenylphthalyl)-β-alanyl-S-crotyl-β-aminoethanethiol, N-(4-phenylphthalyl)-β-alanyl-S-benzyl-β-aminoethanethiol, N-(4-phenylphthalyl)-β-alanyl-S-allyl-β-aminoethanethiol, N-(4-phenylphthalyl)-β-alanyl-S-methallyl-β-aminoethanethiol, N-(4-phenylphthalyl)-β-alanyl-S-crotyl-β-aminoethanethio, N-(3-bromophthalyl)-β-alanyl-S-benzyl-β-aminoethanethiol, N-(3-bromophthalyl)-β-alanyl-S-allyl-β-aminoethanethiol, N-(3-bromophthalyl)-β-alanyl-S-methallyl-β-aminoethanethiol, N-(3-bromophthalyl)-β-alanyl-S-crotyl-β-aminoethanethiol, N-(3-chlorophthalyl)-β-alanyl-S-benzyl-β-aminoethanethiol, N-(3-chlorophthalyl)-β-alanyl-S-allyl-β-aminoethanethiol, N-(3-chlorophthalyl)-β-alanyl-S-methallyl-β-aminoethanethiol, N-(3-chlorophthalyl)-β-alanyl-S-crotyl-β-aminoethanethiol, N-(3-nitrophthalyl)-β-alanyl-S-benzyl-β-aminoethanethiol, N-(3-nitrophthalyl)-β-alanyl-S-allyl-β-aminoethanethiol, N-(3-nitrophthalyl)-β-alanyl-S-methallyl-β-aminoethanethiol, and N-(3-nitrophthalyl)-β-alanyl-S-crotyl-β-aminoethanethiol.

EXAMPLE 2

*Preparation of β-alanyl-S-benzyl-β-aminoethanethiol*

A mixture of 7.37 g. (0.02 mole) of N-phthalyl-β-alanyl-S-benzyl-β-aminoethanethiol and 1.18 g. (0.02 mole) of 85 percent hydrazine hydrate in 50 ml. of ethanol was heated at the reflux temperature. Complete solution was rapidly obtained and after about 15 minutes a precipitate of phthalhydrazide separated. Heating was continued a total of one hour. The reaction mixture was concentrated to dryness and 150 ml. of water and 50 ml. of 1N hydrochloric acid were added. The mixture was warmed and then cooled to room temperature. The undissolved solid was removed and the filtrate concentrated under reduced pressure. The residue was recrystallized three times from alcohol-ether to yield β-alanyl-S-benzyl-β-aminoethanethiol hydrochloride, having a melting point of 164.5–166.5° C.

In like manner, any of the N-phthalyl-β-alanyl-S-substituted-β-aminoethanethiol or N-substituted-phthalyl-β-alanyl-S-substituted-β-aminoethanethiol compounds described in Example 1 may be substituted for N-phthalyl-β-alanyl-β-amino-S-benzyl-β-aminoethanethiol in Example 2 to produce β-alanyl-S-substituted-β-aminoethanethiol wherein the substituted group is benzyl, allyl, methallyl or crotyl.

The β-alanyl-S-substituted-β-aminoethanethiol wherein the substituted group is benzyl, allyl, methallyl or crotyl may be reacted with α-hydroxy-β,β-dimethyl-γ-butyrolactone to form α,γ-dihydroxy-β,β-dimethylbutyryl-β-alanyl-S-substituted-β-aminoethanethiol and the latter compound may be reduced to form α,γ-dihydroxy-β,β-dimethylbutyryl-β-alanyl-β-aminoethanethiol. This process is fully described and claimed in my co-pending application filed on even date herewith, Serial No. 329,928.

The above description and examples are intended to be illustrative only. Any modifications of, or variations therefrom, which conform to the spirit of the invention are intended to be included within the scope of the claims.

What is claimed is:

1. A compound of the formula

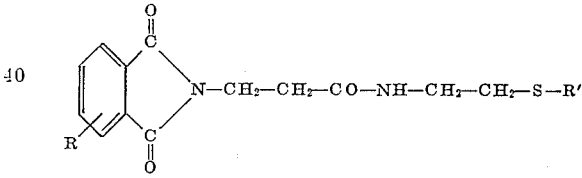

wherein R is selected from the group consisting of hydrogen, alkyl, alkoxy, and halo, and R' is selected from the group consisting of an alkenyl and aralkyl radical having a double bond in the β, γ position relative to the sulfur atom.

2. N-phthalyl-β-alanyl-S-benzyl-β-aminoethanethiol.

3. The process which comprises reacting a compound of the formula

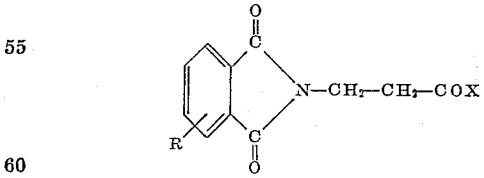

wherein R is selected from the group consisting of hydrogen, alkyl, alkoxy, and halo, and X is halide with an S-substituted-β-aminoethanethiol, wherein the substituted radical is selected from the group consisting of an alkenyl and an aralkyl radical having a double bond in the β, γ position relative to the sulfur atom, to form the corresponding N-substituted-β-alanyl-S-substituted-β-amino-ethanethiol.

4. The process which comprises reacting N-(3-alkylphthalyl)-β-alanyl halide with S-substituted-β-amino-ethanethiol wherein the substituted radical is an aralkyl radical having a double bond in the β,γ-position relative to the sulfur atom to form N-(3-alkyl-phthalyl)-β-alanyl-S-substituted-β-aminoethanethiol.

5. The process which comprises reacting N-(3-alkoxyphthalyl)-β-alanyl halide with S-substituted-β-aminoethanethiol wherein the substituted radical is an aralkyl radical having a double bond in the β,γ-position relative to the sulfur atom to form N-(3-alkoxy-phthalyl)-β-alanyl-S-substituted-β-aminoethanethiol.

6. The process which comprises reacting N-(3-halo-phthalyl)-β-alanyl halide with S-substituted-β-aminoethanethiol wherein the substituted radical is an aralkyl radical having a double bond in the β,γ-position relative to the sulfur atom to form N-(3-halo-phthalyl)-β-alanyl-S-substituted-β-aminoethanethiol.

7. The process which comprises reacting N-phthalyl-β-alanyl halide with S-substituted-β-aminoethanethiol wherein the substituted radical is an aralkyl radical having a double bond in the β,γ-position relative to the sulfur atom to form N-phthalyl-β-alanyl-S-substituted-β-aminoethanethiol.

8. The process which comprises reacting N-phthalyl-β-alanyl chloride with S-benzyl-β-aminoethanethiol to form N-phthalyl-β-alanyl-S-benzyl-β-aminoethanethiol.

9. N - phthalyl - β - alanyl - S - substituted - β - aminoethanethiol wherein the substituted radical is an aralkyl radical having a double bond in the β,γ-position relative to the sulfur atom.

10. N - (3 - alkyl - phthalyl) - β - alanyl - S - substituted-β-aminoethanethiol wherein the substituted radical is an aralkyl radical having a double bond in the β,γ-position relative to the sulfur atom.

11. N - (3 - alkoxy - phthalyl) - β - alanyl - S - substituted-β-aminoethanethiol wherein the substituted radical is an aralkyl radical having a double bond in the β,γ-position relative to the sulfur atom.

12. N - (3 - halo - phathalyl) - β - alanyl - S - substituted-β-aminoethanethiol wherein the substituted radical is an aralkyl radical having a double bond in the β,γ-position relative to the sulfur atom.

References Cited in the file of this patent
UNITED STATES PATENTS 2,680,767   Snell et al. _____ June 8, 1954

OTHER REFERENCES

Wittle et al.: "JACS," vol. 75, Apr. 5, 1953, pp. 1694 and 1698 (received June 7, 1952).

Reynolds et al.: JACS, vol. 69, pp. 911–15 (1947).

Moersch et al.: JACS, vol. 69, pp. 2619–21 (1947).